No. 859,978. PATENTED JULY 16, 1907.
E. M. ROSENBLUTH.
ACETYLENE GAS GENERATOR.
APPLICATION FILED JAN. 14, 1905.
3 SHEETS—SHEET 2.
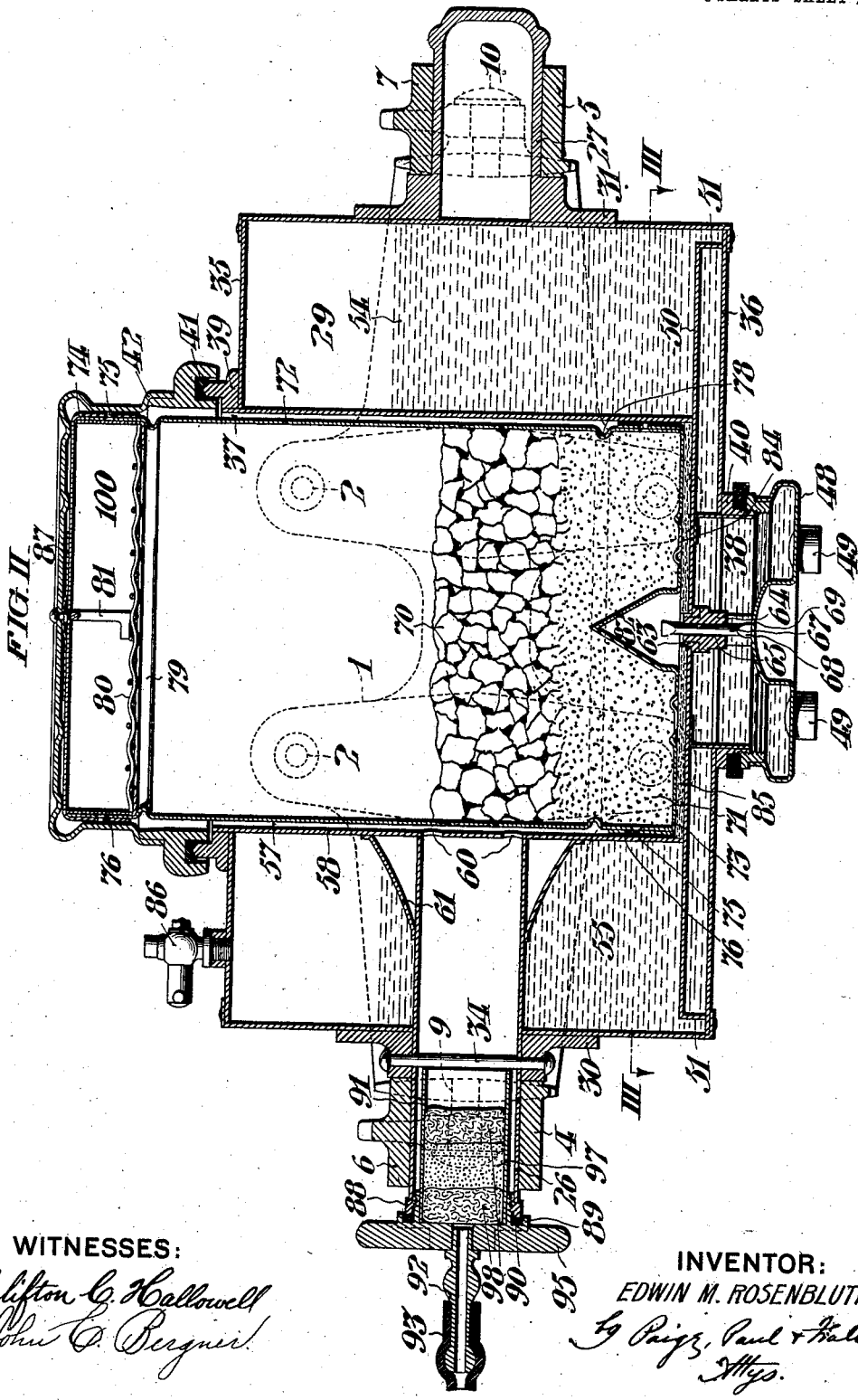
WITNESSES:
Clifton C. Hallowell
John E. Bergner
INVENTOR:
EDWIN M. ROSENBLUTH,
By Paige, Paul & Foley,
Attys.

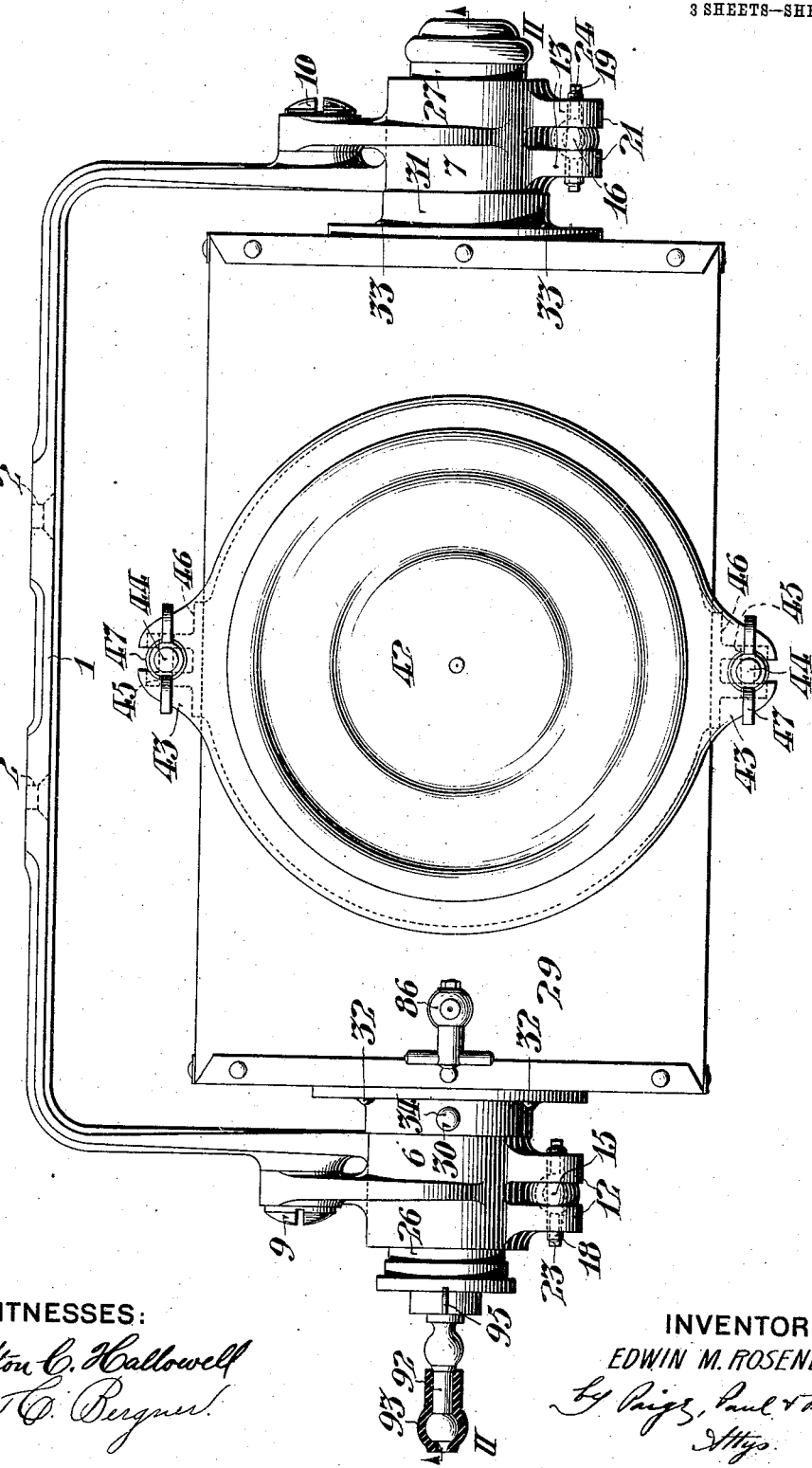

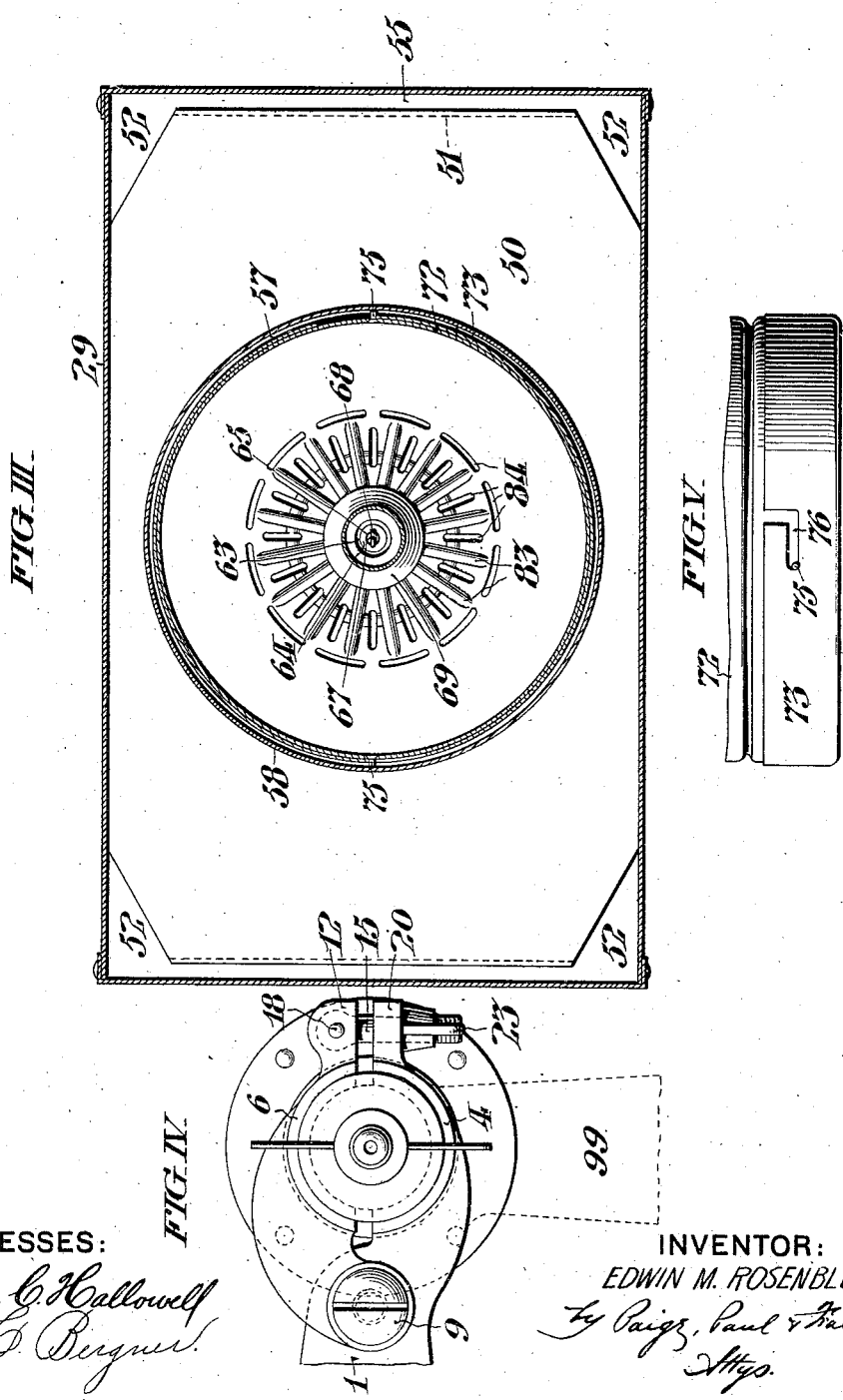

UNITED STATES PATENT OFFICE.

EDWIN M. ROSENBLUTH, OF PHILADELPHIA, PENNSYLVANIA.

ACETYLENE-GAS GENERATOR.

No. 859,978.     Specification of Letters Patent.     Patented July 16, 1907.

Application filed January 14, 1905. Serial No. 240,982.

*To all whom it may concern:*

Be it known that I, EDWIN M. ROSENBLUTH, of Philadelphia, in the State of Pennsylvania, have invented certain new and useful Improvements in Acetylene-Gas Generators, whereof the following is a specification, reference being had to the accompanying drawings.

My improvements may be applied with particular advantage in portable generators carried in vehicles, or employed in households; it being the object and effect of my invention to provide a generator in which the generation of gas may be immediately terminated and immediately resumed when desired.

It has been found in practice that mere termination of the supply of water to the carbid does not terminate the generation of gas, for what is termed "after generation" continues for a considerable time after the supply of water is terminated until all moisture is absorbed, by the undecomposed carbid, from the moist ashes with which it remains in contact. Moreover, when such generation finally ceases, it is impossible to instantly resume generation by resuming the supply of water, for the water must percolate through the dried body of ashes and moisten the latter before reaching the carbid.

As hereinafter described, my invention comprises a generator wherein the undecomposed carbid and the ashes are maintained in the same receptacle, but the latter is so arranged that the undecomposed carbid may be instantly separated from the moist ashes and instantly brought into contact therewith when desired; such relative movement of the ashes and carbid being attained by inversion of the receptacle containing them, which is provided with means to detain the ashes at one end thereof and permit the carbid to gravitate toward or away from the ashes in accordance with the position to which said receptacle is turned. Moreover, said receptacle is provided with a water inlet at one end which is submerged in water when the receptacle is inverted to the generating position, and removed from the water when the receptacle is inverted from that position.

The generator hereinafter described comprises an outer casing inclosing separate chambers for carbid and water, pivoted to turn to a position in which the water from the water chamber has access to the carbid in the carbid chamber through said inlet, but, when turned to another position said inlet is not only removed from the water, so that the latter gravitates away from the carbid, but the mass of undecomposed carbid also gravitates away from the ashes in the carbid chamber, and consequently further decomposition of the carbid by moisture from the ashes is prevented.

My improvements comprise various novel features of construction and arrangement hereinafter more definitely specified, including peculiar means for filtering the gas to separate it from entrained moisture, and means for preventing the accidental displacement of said casing from either position of inversion to which it has been set.

In the accompanying drawings, Figure I, is a plan view of a generator conveniently embodying my improvements. Fig. II, is a vertical sectional view of said generator taken on the line II, II, in Fig. I. Fig. III, is a plan sectional view taken on the line III, III, in Fig. II. Fig. IV, is an end view of an adjustable clamp bearing arranged to prevent accidental displacement of the generator casing. Fig. V, is a fragmentary elevation of the lower end of the receptacle for carbid and ashes shown in section in Fig. II; illustrating the bayonet joint between the receptacle and its cover.

In said figures,—1, is a frame conveniently arranged to support the generator casing from a vertical wall, to which it may be attached by screws extending through the apertures 2. Said frame 1, carries alined bearings comprising the lower members 4, and 5, in rigid relation with said frame, and the upper members 6, and 7, which are pivotally connected with said frame by studs 9, and 10. The free ends of said pivoted bearing members 6, and 7, are respectively provided with bifurcated lugs 12, and 13, in which the swing bolts 15, and 16, turn on respective pivot pins 18, and 19. Said bolts are fitted between corresponding bifurcated lugs 20, and 21, on the bearing members 4, and 5, and are conveniently secured therein by the wing nuts 23, and 24, so as to clamp the axially alined trunnions 26, and 27, of the generator casing 29. As shown in Fig. II, said trunnions 26, and 27, are provided with the annular flanges 30, and 31, secured to the opposite end walls of the casing 29, by rivets 32, and 33, and said flange 30, is connected with the trunnion 26, by the rivet 34, extending diametrically therethrough.

As shown in Fig. II, the upper and lower walls 35, and 36, of the casing 29, respectively comprise circular openings 37, and 38, surrounded by flanges 39, and 40. The flange 39, is fitted to the gasket 41, in the removable lid 42, and the latter comprises bifurcated lugs 43, (shown in Fig. I), which receive the bolts 44, which are arranged to swing on the pivots 45, in the brackets 46, secured to the casing 29, and are conveniently provided with the wing nuts 47, to compress the lid 42, upon said flange 39. As shown in Fig. II, the flange 40, is screw threaded to engage the removable lid 48, which may be conveniently engaged and rotated by its bosses 49.

The diaphragm 50, immediately adjoins the opening 38, in the casing wall 36, and is conveniently supported by its flanges 51, and by soldered connection with the opposite side walls of said casing 29. As shown in Fig. III, said diaphragm 50, is cut away at the corners so as to form openings 52, through which the water 54, passes freely above and below said diaphragm 50, in the water chamber 55. Said chamber 55, is rectangular in area, as shown in Fig. III, and surrounds the cylindrical carbid chamber 57, inclosed by the casing 58, whose inner end is secured to said diaphragm 50, and whose outer end is secured in registry with the opening 37, as shown in Fig. II. Said casing 58, is provided with the gas outlets 60, in communication with the hollow cylindrical trunnion 26, and said trunnion and casing are connected and braced by the conical flange 61, which is soldered to them. Said diaphragm 50, is provided with the screw threaded socket 63, which is conveniently disposed in concentric relation with the opening 38, in the wall 36, and normally retains the screw threaded bushing 64, which may be conveniently rotated and removed when desired. Said bushing 64, comprises a water passage-way 65, restricted by the plunger 67, which latter is arranged to reciprocate therein and is provided at its opposite ends with enlargements 68, to prevent its removal from said passage-way. When the lid 48, is in position to seal the opening 38, as shown in Fig. II; said plunger 67, is uplifted by the abutment 69, in said lid. Said plunger 67, serves a double purpose in the water passage 65; first, it insures sufficient frictional resistance to the passage of water therethrough to the carbid chamber 57, in a thin tubular film surrounding said plunger, and, second, said plunger is adapted to reciprocate so that when the lid 48, is removed, the plunger may be freely manipulated to remove any obstructions which may have lodged in said passageway.

The receptacle which is arranged to contain both carbid 70, and ashes 71, and to bring them into contact or separate them in accordance with its position, is conveniently formed of the cylindrical shell 72, and opposite end lids 73, and 74, which latter are secured in removable relation with said shell by the studs 75, and bayonet slots 76, indicated in Fig. IV. Said shell comprises the inwardly pressed circumferential flanges 78, and 79, the former being arranged to normally detain the ashes 71, in stationary relation to said shell, and the latter serving to support the foraminous screen 80, which is provided with the handle 81, so that it may be conveniently removed when desired, and by which particles of carbid ashes 71, may be sifted from the carbid 70, as hereinafter described.

As shown in Figs II, and III, the receptacle lid 73, comprises the thin sheet metal plate having the central dome 82, in concentric relation with the plunger 67, and, said dome is surrounded by radial channels 83, and adjacent perforations 84, in said plate. Said channels open outwardly so that they may be readily cleaned of any deposit of ashes when the receptacle is removed from the generator casing, but, said channels are normally closed by the circular pad 85, of asbestos felt, or other porous material, upon which said lid 73, rests when in operative position as shown in Fig. II; in which position the plate comprising said channels 83, is retained in intimate contact with said pad by the spring 87, secured by a rivet, to the casing lid 42. It is to be understood that the arrangement described is such that the water supplied in a thin tubular film through the passage way 65, surrounding the plunger 67, is absorbed by the pad 85, and radially distributed from the latter through the channels 83, and perforations 84, to the carbid ashes 71, and carbid 70, resting thereon in the position shown in Fig. II. However, it is to be understood that the water 54, cannot subside in the chamber 55, and rise through the passageway 65, except when the vacuum valve 86, in the wall 35, of the casing 29, is opened.

The gas generated within the receptacle, upon admission of water as above described, escapes thence into the carbid chamber 57, surrounding said receptacle and passes through the gas outlets 60, to the hollow trunnion 26. In order to separate entrained moisture from the gas before its discharge from the generator, I find it convenient to provide said trunnion 26, with the screw threaded flange 88, to engage the screw cap 89, and seal the joint between them by pressure upon the gasket 90. Said cap carries the cylindrical filter casing 91, and the nozzle 92, arranged to receive the flexible gas conduit 93, leading to the burner. Said cap may be provided with the wings 95, shown in Figs. I, and II, or other means by which it may be conveniently inserted or removed whenever it is necessary to renew the charge of filtering material in said casing 91. As indicated in Fig. II, the filtering material comprises a mass of carbid ashes 97, conveniently supported and retained by partitions of fibrous material such as absorbent cotton 98, through which the gas is discharged.

The apparatus above described may be operated as follows:—The valve 86, being closed and the casing 29, inverted with the opening 38, at the top thereof, and, the lid 48, being removed; the water chamber 55, may be charged with water 54, poured through said opening 38, upon the diaphragm 50, and into the chamber through the corner openings 52, shown in Fig. III. Thereupon, the casing may be turned to the position shown in Fig. II, and, the valve 86, remaining closed, the water is prevented from rising through the water passage 65, by the atmospheric pressure opposed to the partial vacuum within said chamber 55. In this position the swing bolts 44, being released from the lid 42, the latter may be removed and the receptacle withdrawn. The lid 74, and the foraminous screen 80, being removed from the receptacle shell 72; a charge of carbid 70, may be deposited within said shell upon the channeled and perforated plate comprising the lid 73, and, said screen 80, and lid 74, being replaced; the receptacle may be fitted in the carbid chamber 57, and the lid 42, clamped in position as shown in Fig. II. Thereupon, the valve 86, being opened, the water 54, is permitted to subside in the chamber 55, and rise through the water inlet 65, and percolate into the receptacle through the porous pad 85, etc., causing the gas to be generated by the decomposition of the carbid 70, in the receptacle. It is to be understood that the gas escapes from the receptacle to the surrounding space through the crevices between the receptacle shell 72, and lids at the opposite ends thereof, it being found in practice that no special vent is required for the gas. It being desired to terminate the generation of gas the vacuum valve 86, is closed and the casing 29, inverted, the clamp bearings 6, and 7, being released by rotation of the nuts 23, and 24, on the swing bolts 15, and 16, for that purpose. Said casing 29, being inverted the carbid 70, instantly separates from the moist ashes 71, and gravitates against the screen 80, the moist ashes 71, being retained adjacent to the water inlet 65, by the circumferential flange 78. Contemporaneously, the supply of water through the passage way 65, ceases as the water gravitates away from said inlet which is then at the top of the casing. It being desired to resume the generation of gas the casing 29, is again inverted to the position shown in Fig. II; the carbid 70, falls from the screen 80, upon the moist ashes 71; the generation of gas is instantly resumed by the absorption of moisture from the ashes 71. Contemporaneously, the flow of water into the carbid receptacle is resumed, the water inlet passage 65, being submerged as above described.

It is to be understood that when it is desired to remove the ashes 71, the foraminous screen 80, may be utilized to separate from the lumps of carbid 70, any particles of ashes tending to adhere thereto; such separation being effected by inverting the receptacle from the position shown in Fig. II, (while removed from the generator,) and shaking the same with the carbid resting upon said screen, so that said particles fall through the latter into the chamber 100, from which they may be discharged by removing the lid 74.

Although, where it is desired to support the generator from a vertical wall, I find it convenient to employ a horizontal frame 1; it is to be understood that the adjustable clamp bearings for the trunnions 26, and 27, may be supported from the floor, upon vertical standards 99, such as are indicated in Fig. IV; and, that the generator may be otherwise arranged to be inverted to effect the described relative movement of the carbid and ashes, which is characteristic of my invention. Therefore, I do not desire to limit myself to the precise details of construction and arrangement herein set forth, as various modifications may be made therein without departing from the essential features of my invention.

I claim:—

1. In an acetylene gas generator, the combination with a receptacle arranged to contain carbid and carbid ashes together; a water inlet at one end of said receptacle; means restricting said water inlet to an invariable area; means arranged to retain carbid ashes in said receptacle adjacent to said inlet; trunnions for said receptacle, arranged to permit its inversion; means for retaining said receptacle in either operative or inoperative position comprising adjustable clamp bearings for said trunnions, comprising rigid lower members and hinged upper members; and, pivoted bolts arranged to draw said members together, substantially as set forth.

2. In an acetylene gas generator, the combination with a receptacle for carbid having a metal plate at one end thereof, comprising radial channels and perforations between said channels; and, a water supply inlet in concentric communication with said radial channels, substantially as set forth.

3. In an acetylene gas generator, the combination with a receptacle for carbid having a metal plate at one end thereof, comprising radial channels and perforations between said channels; a pad of absorbent material in contact with said plate upon the channeled side thereof; and, a water supply inlet in communication with said channels, substantially as set forth.

4. In an acetylene gas generator, the combination with a receptacle arranged to contain carbid and ashes together and having a water inlet at one end thereof; of a foraminous screen in said receptacle forming a chamber at the opposite end thereof, substantially as set forth.

5. In an acetylene gas generator, the combination with a receptacle arranged to contain carbid and ashes together and having a water inlet at one end thereof; of a removable foraminous screen in said receptacle forming a chamber at the opposite end thereof, substantially as set forth.

6. In an acetylene gas generator, the combination with a receptacle for carbid; of a water supply inlet in communication with said receptacle; a plunger arranged to reciprocate through said inlet; a dome protecting said plunger; and a sheet metal plate comprising water channels radiating from said dome, substantially as set forth.

7. In an acetylene gas generator, the combination with a casing arranged to contain carbid, carbid ashes and water; of means to invert said casing and thereby separate the carbid from the ashes and the water; and, a vacuum valve connecting the water chamber with the atmosphere, arranged to control the flow of water to the carbid when said casing is in operative position, substantially as set forth.

8. In an acetylene gas generator, the combination with a receptacle for carbid; of a water supply inlet in communication with said receptacle; a plunger arranged to reciprocate through said inlet; and, a lid covering said plunger arranged to hold the latter in definite relation with said inlet, substantially as set forth.

9. In an acetylene gas generator, the combination with a receptacle arranged to contain carbid and carbid ashes together; of a water inlet at one end of said receptacle; means restricting said water inlet to an invariable area; means arranged to retain carbid ashes in said receptacle adjacent to said inlet; means supporting said receptacle, arranged to permit its inversion; and, means for retaining said receptacle in either operative or inoperative position, substantially as set forth.

10. In an acetylene gas generator, the combination with a receptacle arranged to contain carbid and ashes and to permit the carbid to gravitate toward and away from the ashes; of a water inlet at one end of said receptacle; means restricting said water inlet to an invariable area; and, means in said receptacle to retain the moist ashes adjacent to said inlet, substantially as set forth.

11. In an acetylene gas generator, the combination with a receptacle arranged to contain carbid and ashes and to permit the carbid to gravitate toward and away from the ashes; of a water inlet at one end of said receptacle; and, means to retain the moist ashes adjacent to said inlet, comprising a corrugation in the wall of said receptacle, substantially as set forth.

In testimony whereof, I have hereunto signed my name, at Philadelphia, Pennsylvania, this thirteenth day of January, 1905.

EDWIN M. ROSENBLUTH.

Witnesses:
ARTHUR E. PAIGE,
ANNA F. GETZFREAD.